(12) United States Patent
Taub et al.

(10) Patent No.: US 6,628,108 B1
(45) Date of Patent: Sep. 30, 2003

(54) METHOD AND APPARATUS TO PROVIDE A LOW VOLTAGE REFERENCE GENERATION

(75) Inventors: Mase Taub, Elk Grove, CA (US); Rajesh Sundaram, Fair Oaks, CA (US); Kerry Tedrow, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 09/746,119

(22) Filed: Dec. 22, 2000

(51) Int. Cl.[7] ................................................. G05F 1/44
(52) U.S. Cl. ........................ 323/281; 323/280; 323/314
(58) Field of Search ................................ 323/312, 313, 323/314, 315, 316, 280, 281

(56) References Cited

U.S. PATENT DOCUMENTS

| 5,374,859 A | 12/1994 | Doyle et al. |
|---|---|---|
| 5,495,453 A | 2/1996 | Wociechowski et al. |
| 5,532,915 A | 7/1996 | Pantelakis et al. |
| 5,594,360 A | 1/1997 | Wojciechowski |
| 5,671,179 A | 9/1997 | Javanifard |
| 5,701,272 A | 12/1997 | Brennan, Jr. |
| 5,859,526 A | * 1/1999 | Do et al. .................... 323/280 |
| 6,051,999 A | 4/2000 | To et al. |
| 6,160,440 A | 12/2000 | Javanifard et al. |
| 6,292,048 B1 | 9/2001 | Li |
| 6,327,690 B1 | 12/2001 | Zhang et al. |
| 6,366,497 B1 | 4/2002 | Guliani et al. |

* cited by examiner

*Primary Examiner*—Jessica Han
(74) *Attorney, Agent, or Firm*—Peter Lam

(57) ABSTRACT

A method and apparatus to provide a low voltage reference generation. The apparatus includes a reference voltage generator to receive a first input voltage signal and output a reference voltage signal. A voltage level detector electrically coupled to the reference voltage generator to receive the reference voltage signal and also receive a second input voltage signal. The voltage level detector compares the second input voltage signal to the reference voltage signal for generating an output based on the compared signals.

23 Claims, 5 Drawing Sheets

METHOD AND APPARATUS TO PROVIDE A LOW VOLTAGE REFERENCE GENERATION

FIELD OF INVENTION

The present invention relates generally to voltage generators. More particularly, the present invention relates to a method and apparatus to provide a low voltage reference generation.

BACKGROUND OF THE INVENTION

A reference voltage generator is a device that is powered by an input voltage and outputs a reference voltage to compare with another voltage. Prior art reference voltage generators use constant voltage input for supplying power to the voltage reference generation circuit. The same constant voltage input is also used for generating the voltage reference.

A problem with this approach is that current technology devices supply different voltage values that vary with time. The current voltage reference generators are limited in their operation since they can only operate under one constant voltage value and need to be redesigned for a different voltage value. Another problem with using same constant voltage input for both supplying current to the circuit and generating a voltage reference is that it loads the voltage potential of the voltage input by having to perform two functions. This results in producing a voltage reference that varies highly with distribution of input voltage through the circuit.

Prior art reference voltage generators also provide a constant output reference voltage irrespective of changes to the input voltage. A problem with this approach is that it is only applicable to a very limited number of electronic devices that support the constant output reference voltage. Thus this approach may not be modified to apply to parts that do not accept the produced constant reference voltage.

BRIEF DESCRIPTION OF THE DRAWINGS

The features and advantages of the present invention are illustrated by way of example and not intended to be limited by the figures of the accompanying drawings in which like references indicate similar elements and in which.

DETAILED DESCRIPTION

A method and apparatus to provide a low voltage reference generation is described. Apparatus includes a reference voltage generator to receive a first input voltage signal and output a reference voltage signal. A voltage level detector electrically coupled to the reference voltage generator to receive the reference voltage signal and also receive a second input voltage signal. The voltage level detector compares the second input voltage signal to the reference voltage signal for generating an output based on the compared signals.

The reference voltage generator includes an internal circuit comprising a plurality of transistors and a voltage supply. The voltage supply, separate from the first input voltage signal, is used to power the plurality of transistors. An advantage of having a separate voltage supply is that the internal circuit draws current only from the voltage supply and not from the first input voltage signal. This allows construction of a low power consuming first input voltage signal and reduces the overall circuit power consumption.

Another advantage of having a separate voltage supply is that the first input voltage signal is left untouched. This allows the first input signal to retain most of its power and produce the reference signal with very low variation across process and temperature skews. Yet another advantage of having a separate voltage supply is that the reference voltage produced corresponds to changes in various first input signals and is highly independent of the power supply that powers the circuit.

One of the uses for generating a reference voltage signal having a low voltage potential is to compare it with the second input voltage signal known as a program voltage signal or "Vpp", of an electronic part. Electronic parts, such as flash devices have a specified voltage range for safe operation. The specified voltage range includes an optimal operating range and a minimum operating range. The electronic part will be damaged if operating below the minimum voltage operating range.

The function of a voltage level detector is to use the reference voltage signal and compare it to an actual Vpp voltage level. The voltage level detector is to apply only Vpp values that are above the minimum operating range of the electronic part for its safe operation. Vpp values in the minimum operating range are low values, a low voltage reference is used to compare these values.

Figure 1:
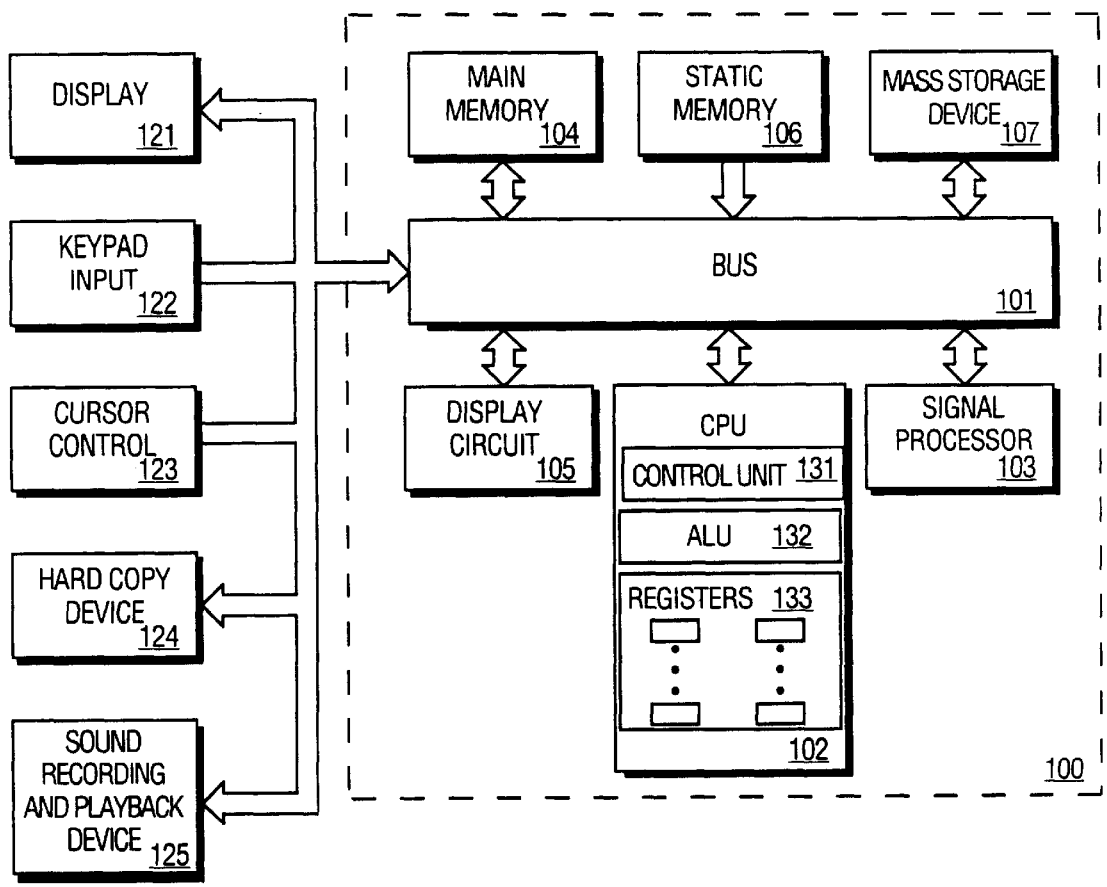
FIG. 1 shows an exemplary digital processing system in which the present invention can be implemented.

FIG. 1 shows an exemplary digital processing system 100 in which the present invention can be implemented. Referring to FIG. 1, digital processing system 100 includes a bus or other communication means 101 for communicating information, and a central processing unit (CPU) 102 coupled with bus 101 for processing information.

CPU 102 includes a control unit 131, an arithmetic logic unit (ALU) 132, and several registers 133, which are used to process information and signals. The circuit of the present invention for generating a very low voltage reference may be implemented within ALU 132. Furthermore, another processor 103 such as, for example, a coprocessor, can be coupled to bus 101 for additional processing power and speed.

Digital processing system 100 also includes a main memory 104, which may be a random access memory (RAM) or some other dynamic storage device that is coupled to bus 101 for storing information or instructions (program code), which are used by CPU 102 or processor 803. Main memory 104 may also be to store temporary variables or other intermediate information during execution of instructions by CPU 102 or processor 103. Digital processing system 100 also includes static memory 106, read only memory (ROM), and/or other static storage devices that are coupled to bus 101, for storing static information or instructions for CPU 102 or processor 103. A mass storage device 107 which may be a hard, floppy, or optical disk drive can be coupled to bus 101 for storing information and instructions for digital processing system 100.

A display 121 such as a cathode ray tube (CRT) or liquid crystal display (LCD) can be coupled to bus 101. Display device 121 displays information or graphics to a user. Digital processing system 100 can interface with display 121 via display circuit 105. A keyboard input 122, or other alphanumeric input device may also be coupled to bus 101 for communicating information and command selections to CPU 102. A cursor control 123 such as a mouse, a trackball, or cursor direction keys maybe coupled to bus 101 for controlling movement of an object on display 121. A hard copy device 124 such as a laser printer may be coupled to bus 101 for printing information on paper, film, or some other like medium. A number of input/output devices such as a sound recording and playback device 125 may also be coupled bus 101.

Figure 2:
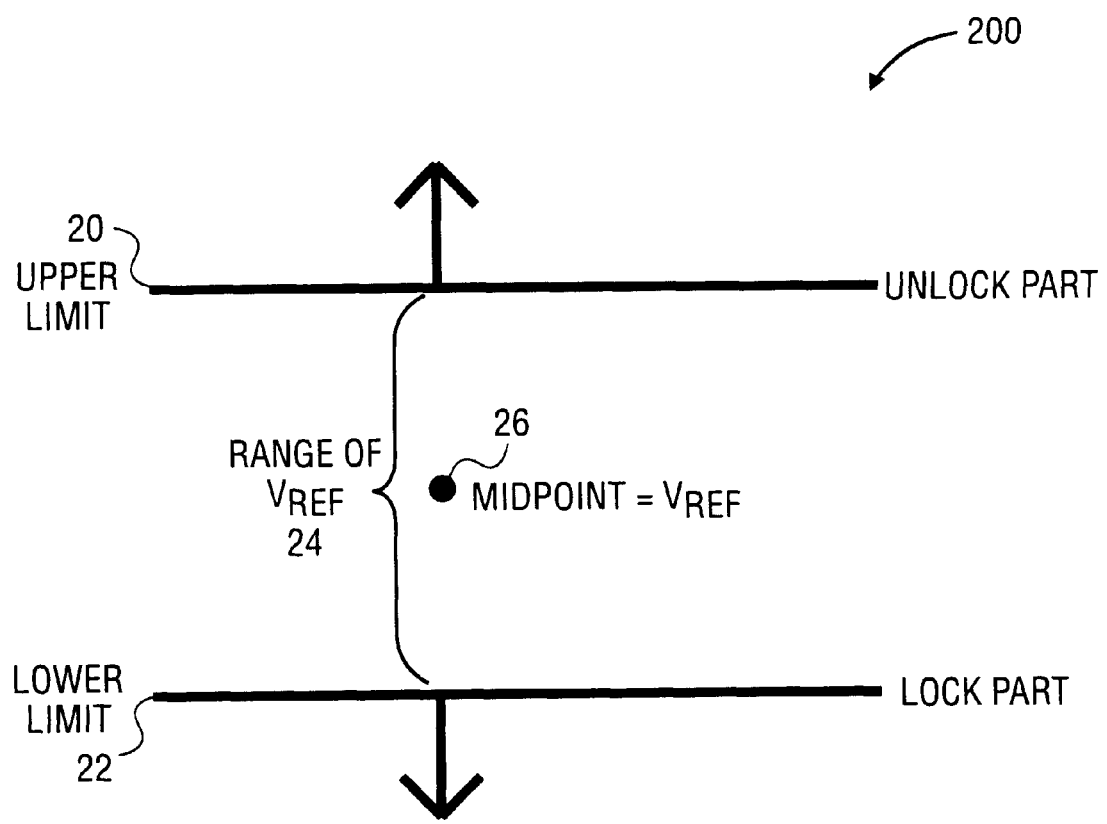
FIG. 2 illustrates a diagram to show a minimum voltage operating range for an electronic device according to one embodiment.

FIG. 2 illustrates a diagram 200 to show a minimum voltage operating range for an electronic part according to one embodiment. As discussed previously, an electronic part includes an optimal voltage operating range and a minimum voltage operating range. A program voltage value, "Vpp", within the electronic part's optimal voltage operating range may be applied to the electronic part for its optimal performance. A Vpp value lower than the optimal voltage operating range and within the minimum voltage operating range may also be applied to the electronic part for its safe operation. Applying a Vpp value lower than the minimum voltage operating range damages the electronic part. A voltage reference is selected within the minimum voltage operating range for comparing actual Vpp voltage level values and ensuring that only actual Vpp voltage level values that are above the minimum voltage operating range are applied to the electronic part.

Referring to FIG. 2, Vpp optimal and minimum voltage operating range values are obtained from the specifications for the electronic part. The optimal and minimum voltage operating vary for every electronic part.

The Vpp minimum voltage operating range includes an upper limit voltage 20 and a lower limit voltage 22. The electronic part may be operated safely by applying Vpp values above the upper limit voltage 20 to the electronic part. Applying Vpp values below the lower limit voltage 22 damages the electronic part.

Vpp values that are between the upper limit voltage 20 and lower limit voltage 22 may also be applied to the electronic part. However it is recommended to include a safety margin by applying Vpp values that are above the lower limit voltage 22 for safe operation of the electronic part.

If Vpp is at or above the upper limit voltage 20 then the electronic part to which Vpp is being applied is unlocked and Vpp is applied to the electronic part. If Vpp is at or below the lower limit voltage 22 then the part is locked and Vpp is not applied to the electronic part. Alternatively, if Vpp value is below the safety margin, then the part is locked and Vpp is not applied to the electronic part.

"$V_{ref}$" is a low voltage reference signal that is selected within the minimum voltage operating range for comparing actual Vpp voltage level values. A $V_{ref}$ value may be selected at any point between the upper limit voltage 20 and the lower limit voltage 22. Typically, a $V_{ref}$ value is selected at a midpoint 26 between the upper limit voltage 20 and the lower limit voltage 22. Midpoint 26 acts as the safety margin and is used for making a decision whether to lock or unlock the part in advance of reaching the lower limit voltage 22. Thus, a Vpp value above the selected $V_{ref}$ value is applied to the electronic part and a Vpp value below the selected $V_{ref}$ value is not applied to the electronic part.

Figure 3:
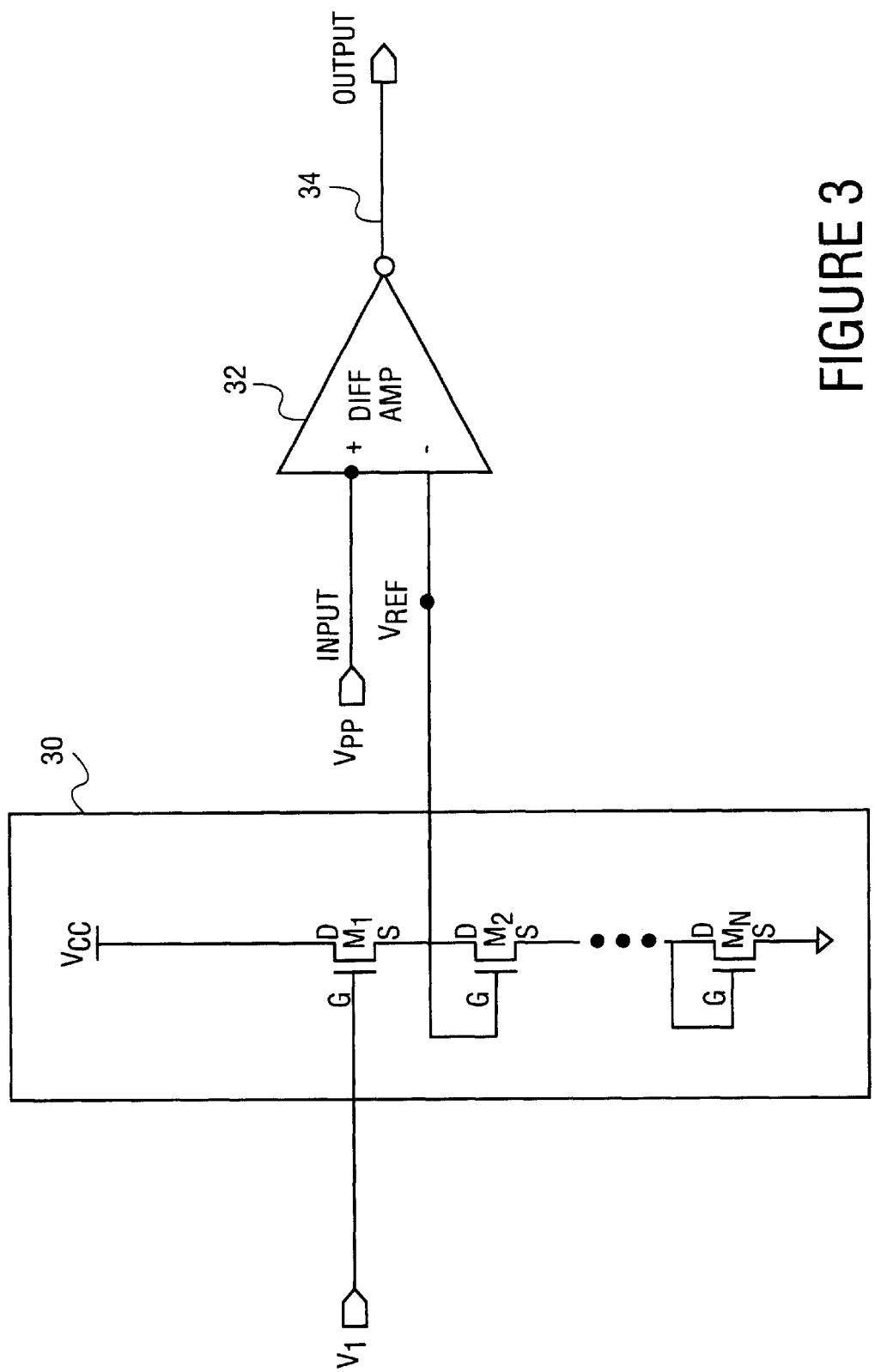
FIG. 3 shows a circuit for generating a low voltage reference according to one embodiment.

FIG. 3 shows a circuit 300 for generating the low voltage reference signal according to one embodiment. Referring to FIG. 3, circuit 300 includes a plurality of transistors M1–Mn that are part of a reference voltage generator, a first input signal "V1", a voltage reference signal "$V_{ref}$", a voltage level detector, a second voltage input signal "Vpp", and a final output. For purposes of explanation, transistors M1–Mn are depleted mode negative-channel metal Oxide semiconductors (NMOS) transistors. A depleted mode NMOS transistor has a threshold voltage between −150 millivolts and +150 millivolts. Alternatively, transistors M1–Mn may be implemented with other types of transistors. Combined circuitry 300 may be a part of ALU 132 used by CPU 102.

The inputs, outputs, and associated circuitry for the circuit 300 will now be described. Voltage potential V1 is generated through use of circuitry or a voltage generating source. The voltage potential at V1 is typically 1.33V for standard electronic part such as a flash device. Alternatively, the voltage potential at V1 varies with the type of electronic part to which it is being applied.

A voltage reference generator 30 is coupled to the voltage potential V1 to receive the first input voltage signal. The voltage reference generator 30 includes an internal circuit comprising a plurality of transistors M1–Mn. The transistors are electrically coupled in series, have the same size within a tolerance, contain the same electrical criteria, and are in a saturation mode. Alternatively, the transistors may be coupled in any combination to produce the selected Vref that is within the electronic part's minimum voltage operating range.

The drain of transistor M1 is coupled to a voltage potential "Vcc". Vcc is a voltage supply for the circuit 300, which provides a saturation current for transistors M1–Mn. The gate of transistor M1 is coupled to V1 to receive the first input voltage signal, and the source of transistor M1 is coupled to drain of transistor M2.

The gate and drain of transistor M2 is coupled to a voltage level detector 32 for outputting the selected Vref. Alternatively, voltage level detector 32 is coupled to gate and drain of any transistor from the plurality of transistors to output the selected $V_{ref}$. For example, if the voltage potential between the drain of transistor M2 and ground is similar to the selected $V_{ref}$, then voltage level detector 32 is coupled to M2. However if selected $V_{ref}$ value is lower than voltage potential between the drain of transistor M2 and ground, then the voltage level detector is coupled to a transistor Mn that has a voltage potential lower than M2 and similar to the selected $V_{ref}$.

Figure 4B:
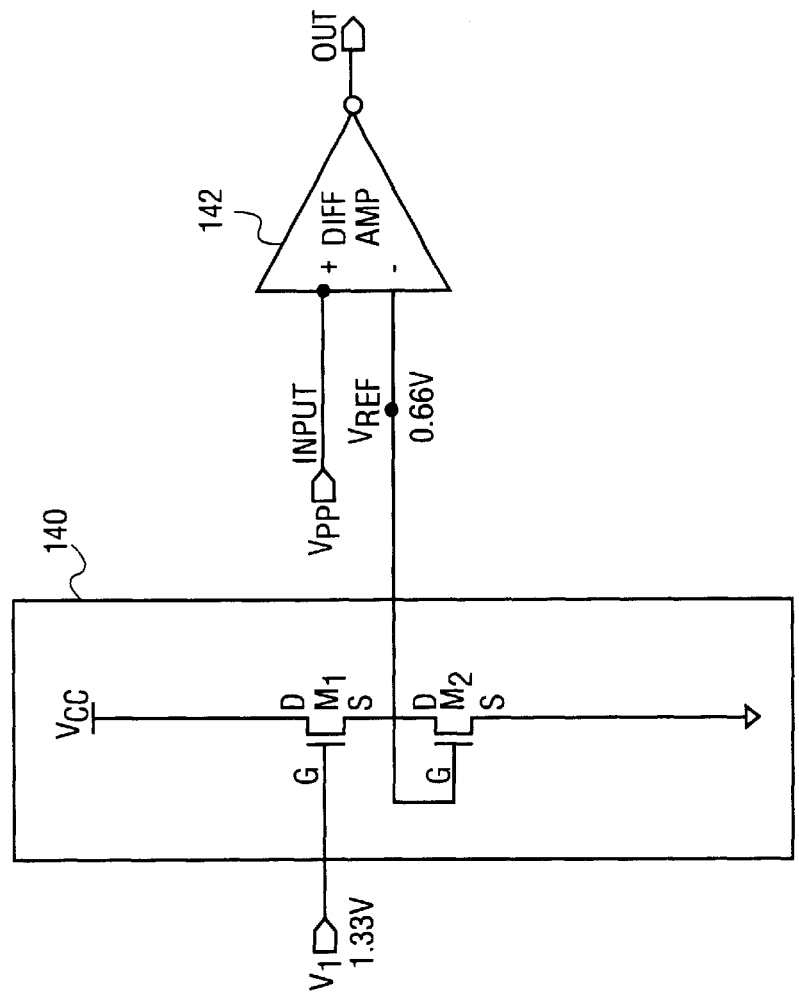
FIGS. 4a and 4b illustrate diagrams to show a minimum voltage operating range and corresponding circuit for a 2V electronic part according to one embodiment.
Figure 5:
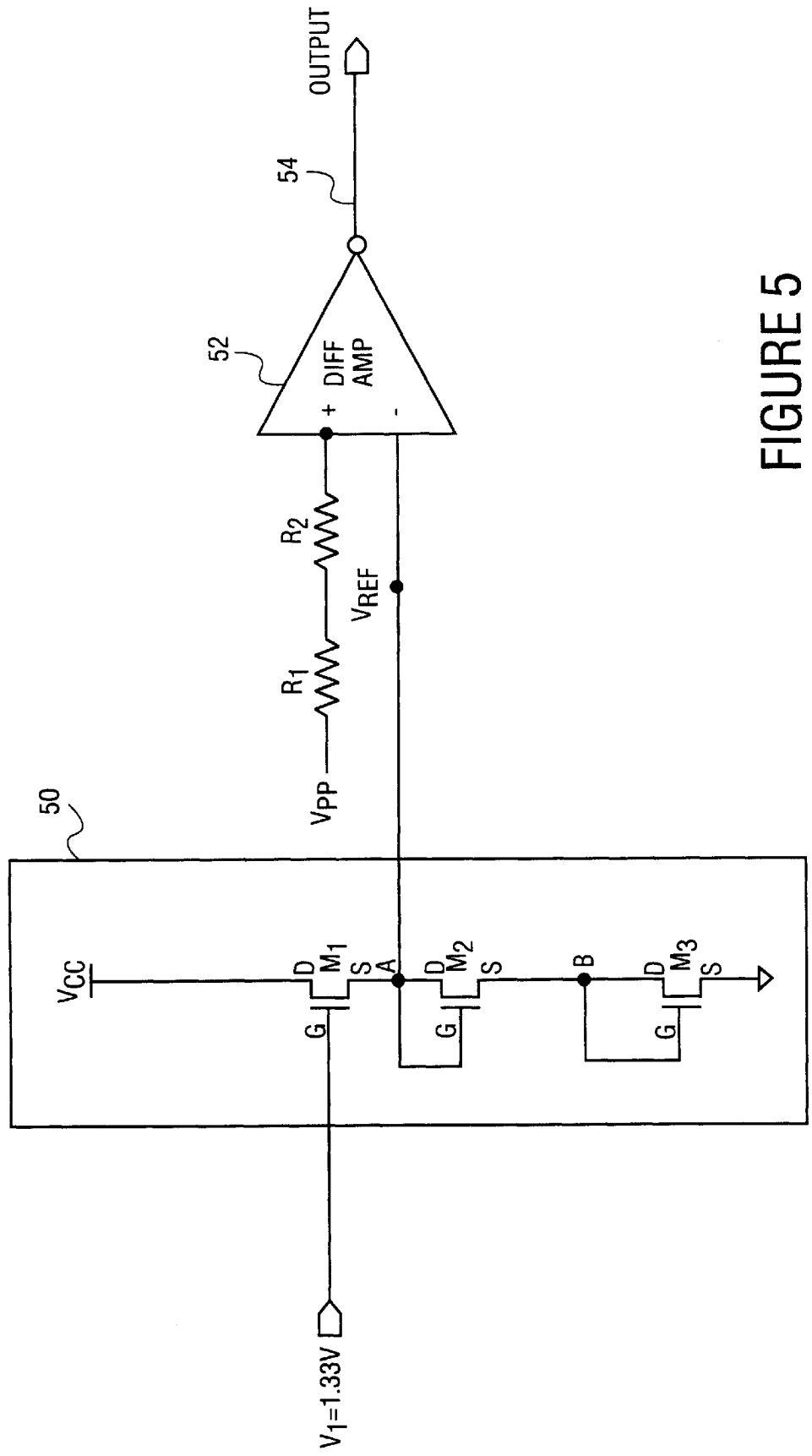
FIG. 5 shows a circuit for producing a voltage reference signal for a 3V electronic part according to one embodiment.

The source of transistor M2 is coupled to either drain of transistor Mn or ground depending upon number of transistors required. The number of transistors required depends upon voltage potential V1 and selected $V_{ref}$. For example for a given V1 if two transistors M1, and M2 are sufficient to produce a voltage potential across at least one transistor that is similar to the selected $V_{ref}$, then source of transistor M2 is coupled to ground. However if the selected $V_{ref}$ is lower than voltage potential across M1 and M2, then N number of transistors are added to produce the selected $V_{ref}$. In such case, source of transistor M2 is coupled to drain of transistor Mn, source of transistor Mn is coupled to ground, and gate of Mn is coupled to source of M2. FIG. 4b shows a circuit including two transistors, and FIG. 5 shows a circuit including more than two transistors.

The voltage level detector 32 coupled to transistor M2 is a differential amplifier. Alternatively, the voltage level detector 32 can be other type of circuitry that performs the same function as that of a differential amplifier. The negative terminal of the differential amplifier 32 receives $V_{ref}$. The positive terminal of the differential amplifier 32 is coupled to Vpp for receiving the second input voltage signal, also known as actual Vpp voltage signal. The differential amplifier has an internal circuit, which compares the received Vpp signal with the received $V_{ref}$.

An output 34 is coupled to the differential amplifier 32. The output 34 is produced by the differential amplifier as a result of the Vpp comparison made using $V_{ref}$. The output is a "1" if the received Vpp signal is above the received $V_{ref}$ value, and a "0" if the received Vpp signal is below the received $V_{ref}$ value. An output of "1" results in the differential amplifier 32 unlocking the electronic part and applying the received Vpp to the electronic part. A value of "0" results in the differential amplifier 32 locking the electronic part and preventing Vpp from being applied to the electronic part, thereby securing the electronic part from being damaged.

In one embodiment and one cycle of operation, $V_{ref}$ is selected for an electronic part that is within the electronic part's Vpp minimum voltage operating range. A circuit 300 is designed to receive a first input signal and produce the determined $V_{ref}$ signal. The circuit 300 includes a number of transistors, wherein the number is selected such that voltage potential across at least one transistor is similar to the selected $V_{ref}$. The circuit 300 also includes a voltage supply Vcc that has a higher voltage potential than the first input signal. Voltage supply Vcc provides a saturation current to the transistors in the reference voltage generator 30 and places the transistors in a saturation mode.

A transistor is in a saturation mode when the gate and drain of the transistor is coupled together. When a transistor is in a saturation mode, the voltage between the drain and the source of the transistor is greater than or equal to the difference between the voltage potential between the gate and source of the transistor and its threshold voltage as indicated in equation (1) below:

$$Vds \geq Vgs - Vt \quad (1)$$

Where Vds=Voltage between drain and source of a transistor, Vgs=Voltage between gate and source of the transistor, and Vt=Transistor threshold voltage.

Alternatively, a transistor is in saturation mode when its gate receives an input voltage, and drain receive a Vcc voltage, where the Vcc voltage potential is higher than the difference between the input voltage and the threshold voltage.

The transistors in saturation receive saturation current from Vcc. The relationship between the saturation current and voltage potential across a transistor in saturation mode is explained in equation (2) shown below:

$$I_{ds} = (\beta/2)*(Vgs-Vt)^2 \quad (2)$$

Where β is a constant determined by equation (3) shown below:

$$\beta = \mu * C_{ox} * W/L \quad (3)$$

Where μ=Effective surface mobility of carrier inside a channel of a transistor, W=Width of the transistor, and L=Length of the transistor.

Equation (2) may be solved to getting the voltage drop across each transistor as shown in equation (4) shown below:

$$Vgs = [2/\beta * Sqrt(Ids)] + Vt \quad (4)$$

Where Vt is a constant threshold voltage.

Since the width, length, effective surface mobility, all electrical criteria, and saturation current Ids for all the transistors is the same, the voltage drop Vgs across each transistor is also the same. Thus the input voltage is equally divided over the number of transistors in the reference voltage generator 30.

The transistor having a voltage potential similar to $V_{ref}$ is coupled to the voltage level detector 32. The voltage level detector 32 compares Vpp to $V_{ref}$ and applies Vpp values that are above $V_{ref}$ to the electronic part.

In another embodiment and another cycle of operation, a circuit 300 is designed to produce any desired $V_{ref}$ voltage signal. The circuit includes the plurality of transistors M1–Mn that are in saturation mode and coupled to a voltage supply for receiving a saturation current. A transistors having the desired $V_{ref}$ voltage between its source and ground is coupled to a differential amplifier. $V_{ref}$ signal is used to compare any second input signal received by the differential amplifier. The comparison results in allowing the received second input signal to pass as the output signal if the received second input signal has a voltage potential that is higher than the $V_{ref}$ signal.

Figure 4A:
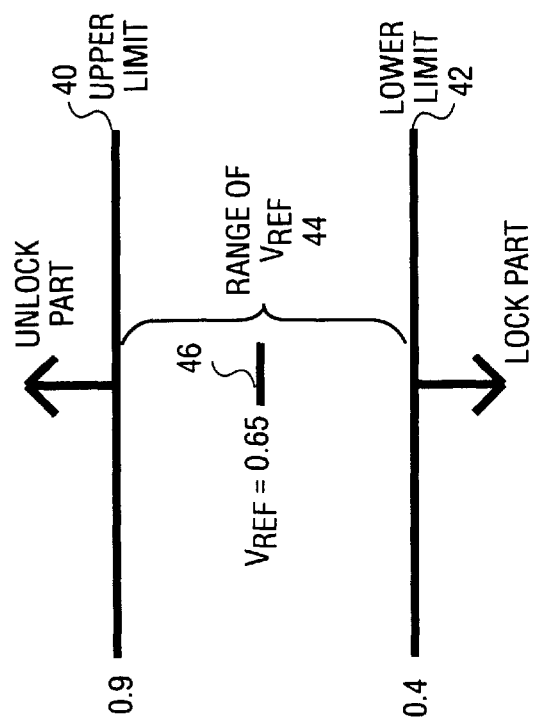

FIGS. 4a and 4b illustrate diagrams to show a minimum voltage operating range for a 2V electronic part and a corresponding circuit according to one embodiment.

Referring to FIG. 4a, the optimal voltage operating range for a 2V electronic part is from 1.65V to 1.95V. The minimum voltage operating range for a 2V electronic part is from 0.4V–0.9V. The minimum voltage operating range for a 2V electronic part includes an upper limit 40 having a voltage potential of 0.9V and lower limit 42 having a voltage potential of 0.4V.

Applying a Vpp above the upper limit 40 of 0.9V operates the 2V electronic part safely. Applying a Vpp below the lower limit 40 of 0.4V damages the 2V electronic part. As shown in FIG. 4a, a $V_{ref}$ range 44 exists between 0.4–0.9V. A $V_{ref}$ may be selected at any point within the $V_{ref}$ range 44. The $V_{ref}$ range 44 includes the lowest values allowed by the electronic part specifications for safe part operation. A $V_{ref}$ may be selected at a midpoint 46 for the 2V electronic part. Selecting a midpoint 46 having a value of 0.65V as the $V_{ref}$ provides a safety margin by locking the part before Vpp reaches 0.4V lower limit voltage. Alternatively, a $V_{ref}$ may be selected at a point higher than midpoint and closer to the upper limit 40 thereby achieving a higher safety margin.

FIG. 4b shows a circuit designed for the standard electronic part such as a 2% flash device that achieves a Vref of approximately 0.65V. The circuit includes a voltage reference generator 140 comprising two transistors M1 and M2 that are connected in series, of same size and electrical criteria, and in saturation.

The input voltage potential V1 of 1.33V is distributed over the two transistors to achieve a voltage potential of 0.66V across each transistor. Transistor M2 is coupled to differential amplifier 142 to output a Vref value of 0.66V. The differential amplifier 142 uses the Vref of 0.66V to compare the current Vpp. If Vpp is above 0.66V then Vpp is applied to the 2V device. However if Vpp is less than 0.66V then the part is locked out and Vpp is not applied.

FIG. 5 shows a circuit for producing a voltage reference signal for a 3V electronic part according to one embodiment. As previously discussed, the midpoint for a 3V electronic part can be determined similar to the 2V electronic part from specifications for the 3V electronic part. The midpoint for a 3V electronic part from specification can be selected at 1.8V.

Which means that if the Vpp in the current circuit is above 1.8V then the part stays unlocked, and if its below 1.8V then part is locked.

One embodiment of designing a circuit to produce a reference signal $V_{ref}$ for comparing current Vpp is further described. A voltage reference generator 50 with three transistors M1–M3 is designed. The gate of the first transistor M1 is coupled to voltage potential V1 to receive the first input voltage signal of 1.33V. The received first input signal of 1.33V is distributed equally across transistors M1, M2, and M3 at 0.443V per transistor.

The drain of M1 is coupled to voltage supply Vcc and the source of M1 is coupled to drain of M2. The gate and drain of M2 is coupled to differential amplifier 52 to output a $V_{ref}$. The source of M2 is coupled to drain of M3. The source of M3 is coupled to ground, and gate of M3 is coupled to source of M2. Since voltage potential V1 is equally distributed at ⅓ per transistor, the transistor M2 is coupled to the differential amplifier 52 at point "A" which is a $V_{ref}$ output, to produce a $V_{ref}$ output of 0.886V.

The negative terminal of a differential amplifier 52 is coupled to transistor M2 to receive the produced $V_{ref}$. The positive terminal of the differential amplifier 52 is coupled to resistor R2. Resister R2 is coupled to resistor R1 in series which is coupled to voltage potential Vpp to receive the second input voltage signal. Since Vpp value of approximately 1.8 is estimated from specification for a 3V part, the two resistors in series drop Vpp voltage by half producing an estimated 0.9V. Using of resistors and dropping estimated Vpp voltage to 0.9V allows a close comparison with the $V_{ref}$ 0.886.

Differential amplifier 52 is coupled at point "A" to achieve a voltage potential $V_{ref}$ similar to the estimated Vpp of 0.9. Alternatively, if a lower value of Vpp is estimated then differential amplifier would be connected at point "B" to produce a lower $V_{ref}$, i.e. to the gate and drain of M3 thereby achieving a $V_{ref}$ of 0.443 instead of 0.886.

The differential amplifier 52 compares $V_{ref}$ of 0.886 with the actual Vpp voltage level. A compared Vpp value above 0.886V results in an output 54 of "1" unlocking and applying the Vpp to the electronic part. A compared Vpp value below 0.886V results in an output 54 of "0" locking and not applying the Vpp to the electronic part.

These and other embodiments of the present invention may be realized in accordance with these teachings and it should be evident that various modifications and changes may be made in these teachings without departing from the broader spirit and scope of the invention. The specification and drawings are, accordingly, to be regarded in an illustrative rather than restrictive sense and the invention measured only in terms of the claims.

What is claimed is:

1. An apparatus comprising:
    a reference voltage generator to receive a first input voltage signal and output a reference voltage signal responsive to the voltage potential of the first input voltage signal; and
    a voltage level detector electrically coupled to the reference voltage generator to receive the reference voltage signal and to receive a second input voltage signal for comparing the second input voltage signal to the reference voltage signal and generating an output based on the compared signals, wherein the output is a first value if the second input voltage signal is greater than the reference voltage signal and a second value if the second input voltage signal is less than the reference voltage signal.

2. The apparatus of claim 1, wherein the voltage level detector further comprises:
    a first terminal to receive the second input voltage signal;
    a second terminal to receive the reference voltage signal; and
    circuitry electrically coupling the first terminal and the second terminal to an output.

3. The apparatus of claim 1, wherein the reference voltage signal has a voltage potential that is lower than the voltage potential of the first input voltage signal.

4. The apparatus of claim 1, wherein the voltage level detector is a differential amplifier.

5. The apparatus of claim 1, wherein the reference voltage generator further comprises:
    a plurality of transistors, wherein at least two of the plurality of transistors are electrically coupled in series, the gate and drain of at least one transistor electrically coupled to a differential amplifier, the source of at least one transistor electrically coupled to a ground, and at least one transistor with its drain electrically coupled to a voltage supply and its gate coupled to an input to receive the first input voltage signal.

6. The apparatus of claim 1, wherein the reference generator and the voltage level detector are part of a flash memory device.

7. The apparatus of claim 1, wherein the reference voltage generator further includes a plurality of transistors.

8. The apparatus of claim 7, wherein the reference voltage signal has a voltage potential that is the same as a voltage potential across each of the plurality of transistors.

9. The apparatus of claim 7, wherein the plurality of transistors are in a saturation mode.

10. The apparatus of claim 7, further including a voltage supply for providing a saturation current to the plurality of transistors.

11. The apparatus of claim 7, wherein current for the plurality of transistors is supplied by a voltage supply.

12. The apparatus of claim 7, wherein the reference voltage signal may be coupled to the gate and drain of any one of the transistors from the plurality of transistors.

13. The apparatus of claim 7, wherein each of the transistors in the plurality of transistors includes similar electrical criteria.

14. The apparatus of claim 1 wherein the output of the voltage level detector is to lock and unlock a part.

15. The apparatus of claim 14 wherein the output of the voltage level detector locks the part if the second input voltage signal is less than the reference voltage signal.

16. A method comprising:
    receiving a first input voltage signal;
    processing the received first input voltage signal to generate a reference voltage signal, wherein the reference voltage signal has a voltage potential that is lower than the voltage potential at the first input voltage signal; and
    comparing the reference voltage signal to a second input voltage signal for generating an output to indicate whether the second input voltage signal has a higher voltage potential than the reference voltage signal, wherein the output signal has a first value if the second input voltage signal is higher and a second value if the second input voltage is lower.

17. The method of claim 16, further comprising providing a saturation current to a plurality of transistors.

18. The method of claim 16, wherein comparing further comprising:

receiving the reference voltage signal;

receiving the second input voltage signal; and determining whether the second input voltage signal is higher or lower than the reference voltage signal.

19. The method of claim 18, further comprising applying the second input voltage signal to an electronic part if the voltage potential of the second input voltage signal is higher than the voltage potential of the reference voltage signal.

20. The method of claim 16, further comprising using a voltage supply to supply current to a circuit that produces the reference voltage signal.

21. The method of claim 16, wherein processing further comprising:

using a plurality of transistors coupled in series;

applying the first input voltage signal to at least one transistor; and distributing the voltage potential from the first input voltage signal equally over the plurality of transistors to output the reference voltage signal such that the reference voltage signal has the same voltage potential as the voltage potential across at least one of the transistors.

22. The method of claim 16 further comprising:

unlocking a circuit with the output signal if the second input voltage has a higher potential than the reference voltage signal; and coupling the second input voltage to the circuit.

23. The method of claim 16 further comprising locking a circuit with the output signal if the second input voltage has a lower potential than the reference voltage signal.

* * * * *

UNITED STATES PATENT AND TRADEMARK OFFICE
CERTIFICATE OF CORRECTION

PATENT NO. : 6,628,108 B1
DATED : September 30, 2003
INVENTOR(S) : Taub et al.

It is certified that error appears in the above-identified patent and that said Letters Patent is hereby corrected as shown below:

<u>Column 6,</u>
Line 49, delete "2%", insert -- 2V --.

Signed and Sealed this

Second Day of March, 2004

JON W. DUDAS
*Acting Director of the United States Patent and Trademark Office*